US009720869B1

(12) United States Patent
Caine et al.

(10) Patent No.: US 9,720,869 B1
(45) Date of Patent: Aug. 1, 2017

(54) COUPLED DEVICE DEPLOYMENT LOCATION CLASSIFICATION

(71) Applicant: NCR Corporation, Duluth, GA (US)

(72) Inventors: Nicholas Caine, Duluth, GA (US); David Mayo, Duluth, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 15/011,599

(22) Filed: Jan. 31, 2016

(51) Int. Cl.
*G06K 7/08* (2006.01)
*G06F 13/40* (2006.01)
*G06F 13/42* (2006.01)
*G06F 13/36* (2006.01)
*G06Q 20/20* (2012.01)

(52) U.S. Cl.
CPC .......... *G06F 13/4068* (2013.01); *G06F 13/36* (2013.01); *G06F 13/4282* (2013.01); *G06K 7/084* (2013.01); *G06Q 20/208* (2013.01)

(58) Field of Classification Search
CPC .... G06K 7/0004; G06K 7/084; G06Q 20/206; G06Q 20/382; G06Q 20/409; G06Q 20/208; G06F 9/4411; G06F 9/4413; G06F 13/4068; G06F 13/4282; G06F 13/36; H04L 41/0853
USPC ........................................................ 235/449
See application file for complete search history.

(56) References Cited

U.S. PATENT DOCUMENTS

| 5,979,773 A * | 11/1999 | Findley, Jr. .......... G06Q 20/206 235/380 |
| 7,203,774 B1 * | 4/2007 | Zhou ..................... G06F 9/4411 710/17 |
| 8,626,959 B2 * | 1/2014 | Ruzek ................... G06F 9/4413 710/8 |
| 9,092,766 B1 * | 7/2015 | Bedier ................. G06Q 20/204 |
| 2002/0116151 A1 * | 8/2002 | Brown .................. G06F 9/4843 702/186 |
| 2005/0198247 A1 * | 9/2005 | Perry .................... H04L 7/0008 709/223 |
| 2007/0215698 A1 * | 9/2007 | Perry .................... G06Q 20/20 235/380 |
| 2008/0033610 A1 * | 2/2008 | Engel ...................... G06F 1/182 701/36 |
| 2009/0240844 A1 * | 9/2009 | Lee ....................... G06F 13/385 710/16 |
| 2013/0041690 A1 * | 2/2013 | Brough .................. G06Q 50/22 705/3 |
| 2015/0134541 A1 * | 5/2015 | Woolf .................. G06K 7/0065 705/72 |

* cited by examiner

*Primary Examiner* — Claude J Brown
(74) *Attorney, Agent, or Firm* — Schwegman, Lundberg & Woessner

(57) ABSTRACT

Various embodiments herein each include at least one of devices, methods, and software for coupled device deployment location classification in an automated manner. One embodiment, in the form of a method, includes searching a device tree of a computing device to identify any devices of interest. This method, for each identified device of interest, may then identify a path within the computing device of the device of interest and classify, based on the identified path, a relative location of the device of interest. This method may then store the classification of the device of interest in a memory device of the computing device.

19 Claims, 4 Drawing Sheets ical block diagram of a method, according
COUPLED DEVICE DEPLOYMENT LOCATION CLASSIFICATION

BACKGROUND INFORMATION

Computing devices, such as personal computers, include different ports through which devices may be coupled. Certain types of devices may be considered acceptable for connection to any port while other devices may only be acceptable when connected to a certain port or a port at a particular location of the device to which it is coupled. For example, it may not be acceptable for a device of a certain device-type to be coupled to certain Universal-Serial Bus (USB) ports of a computer controlling a point-of-sale (POS) terminal, but acceptable with regard to other ports. Such acceptable ports may be internal ports or ports of a root USB hub while unacceptable ports are ports that exposed externally to the POS terminal controlling computer or to a hub other than the root hub. To date, such limitations can be implemented only after manual configuration of the computing device to classify connections of specific devices to a computing device.

SUMMARY

Various embodiments herein each include at least one of devices, methods, and software for coupled device deployment location classification in an automated manner. One embodiment, in the form of a method, includes searching a device tree of a computing device to identify any devices of interest. This method, for each identified device of interest, may then identify a path within the computing device of the device of interest and classify, based on the identified path, a relative location of the device of interest. This method may then store the classification of the device of interest in a memory device of the computing device.

Another method embodiment, for each of at least one device of interest within a computing device, includes classifying, based on an identified path of the device of interest, a location of the device of interest within the computing device. This method may then store the classification of the device of interest in memory.

Another embodiment, in the form of a computing device, includes a root USB hub and an external USB hub coupled to the root USB hub. The computing device further includes a first USB device of a particular USB device-type coupled to the root USB hub and a second USB device of the particular USB device-type coupled to the external USB hub. The computing device also includes a processor, a memory, and a USB device location classification process stored in the memory and executable by the processor to perform data processing activities. The data processing activities are executable by the processor to classify a deployed location of USB devices of the particular USB device-type coupled to the computing device. The data processing activities include, for each USB device of the particular device-type coupled to the computing device, classifying, based on an identified path of the USB device of the particular USB device-type, a location of the USB device and storing the classification of the USB device of interest in the memory.

DETAILED DESCRIPTION

Figure 1:
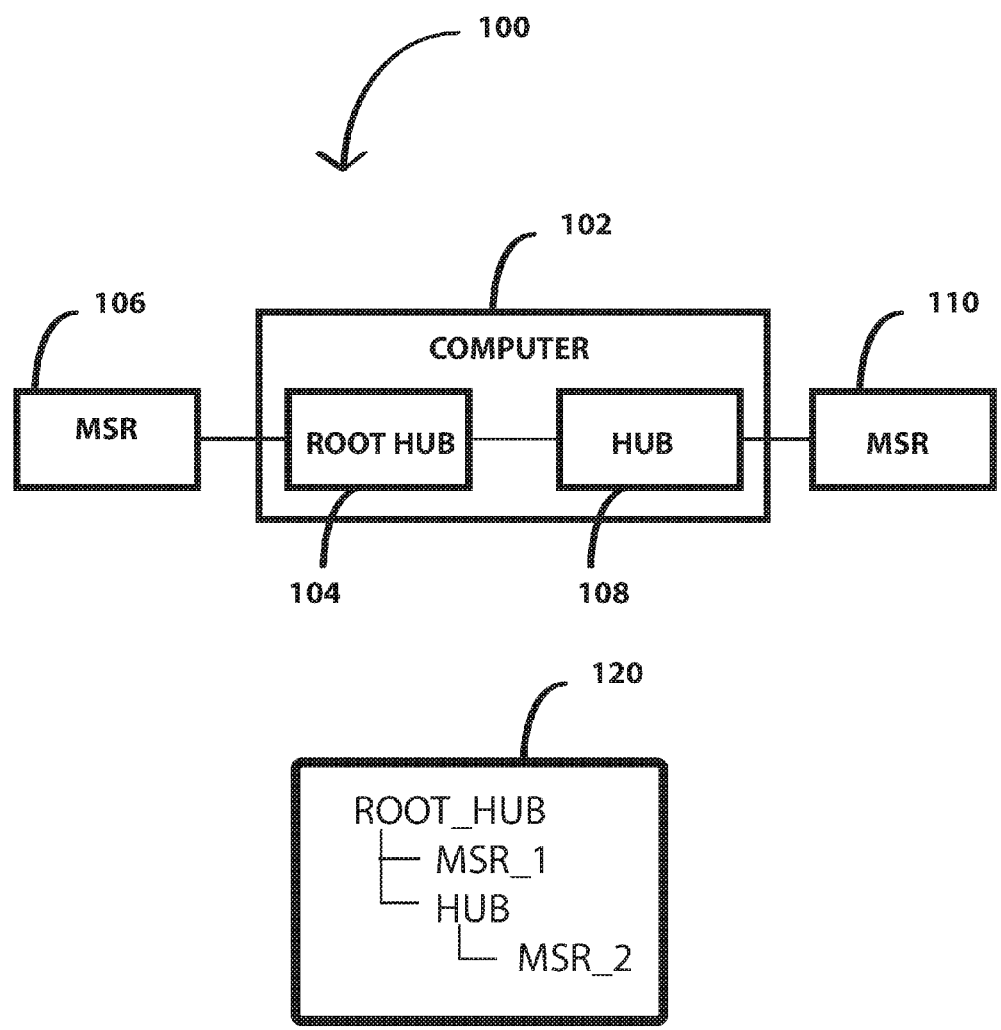
FIG. 1 is a logical block diagram of a computer having two devices connected thereto, according to an example embodiment.

Various embodiments herein each include at least one of devices, methods, and software for coupled device deployment location classification in an automated manner. Such classification allows for devices coupled to a computing device, such as a computer, to be classified by where they are connected to the computing device. This classification facilitates enabling and disabling certain functions of or usage of devices in all or certain ways according to configuration settings with regard to device-types and functions of and usage thereof. For example, when the computing device is a computer that controls operation of a POS terminal, a magnetic stripe reader (MSR) device coupled direct to a root USB hub of the computer may be enabled to allow for bankcard data (e.g., credit card, debit card automate teller machine card, etc.) to be received by the computer while an MSR device coupled to another USB hub may be disabled with regard to bankcard data but enabled with regard to a customer loyalty card. This ability to identify how, or more specifically, identify a path through which certain devices are connected to the computer enables configuration of computers to provide greater security and limit fraudulent transactions and data entry, among other benefits. These and other embodiments are described further herein with regard to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a computer 102 having two devices connected thereto, according to an example embodiment. The computer 102 is an example of a computing device upon which some embodiments may be implemented. The computer 102 may be one portion of a larger system, such as a POS terminal, an automated teller machine (ATM), a self-service checkout terminal or other self-service terminal (SST), and the like.

The computer 102 includes a root hub 104 to which other devices and hubs may be connected to the computer 102. The root hub 104 may be a USB root hub and devices connected thereto may be USB devices and hubs. In some embodiments, the root hub 104 is a USB root hub and connected thereto are an MSR 106 and a USB hub 108. The USB hub 108 may include other devices connected thereto, such as another MSR 110.

The computer 102 includes a processor that executes instructions of an operating system, programs, processes, utilities, and the like that is stored on memory devices of the computer 102. The processes include a process that executes to identify at least some devices connected to the computer 102, how they are connected, and to classify those devices by their connections according to a criteria that comports with other configuration settings of programs and processes that execute on the computer 102. For example, the first MSR 106 connects directly to the root hub 106 and the second MSR 110 connects to the hub 108 which is connected to the root hub 106. The process may execute in some embodiments to build a data structure 120 including data representative of how the devices are connected to the computer 102. This data structure 120 or similar data in other embodiments is then utilized to classify how the devices, such as the two MSR devices 106, 110, are connected to the computer 102. The classifications then inform the other programs and processes, as mentioned above, in view of their configuration settings to enable and disable certain functions or operations of the MSR devices 106, 110, to accept or ignore certain datatypes input via the MSR devices 106, 110, and the like. The process that identifies and classifies how the devices, such as the MSR devices 106, 110, are connected does so in an automated manner without requiring user input to perform the identification and classification.

Figure 2:
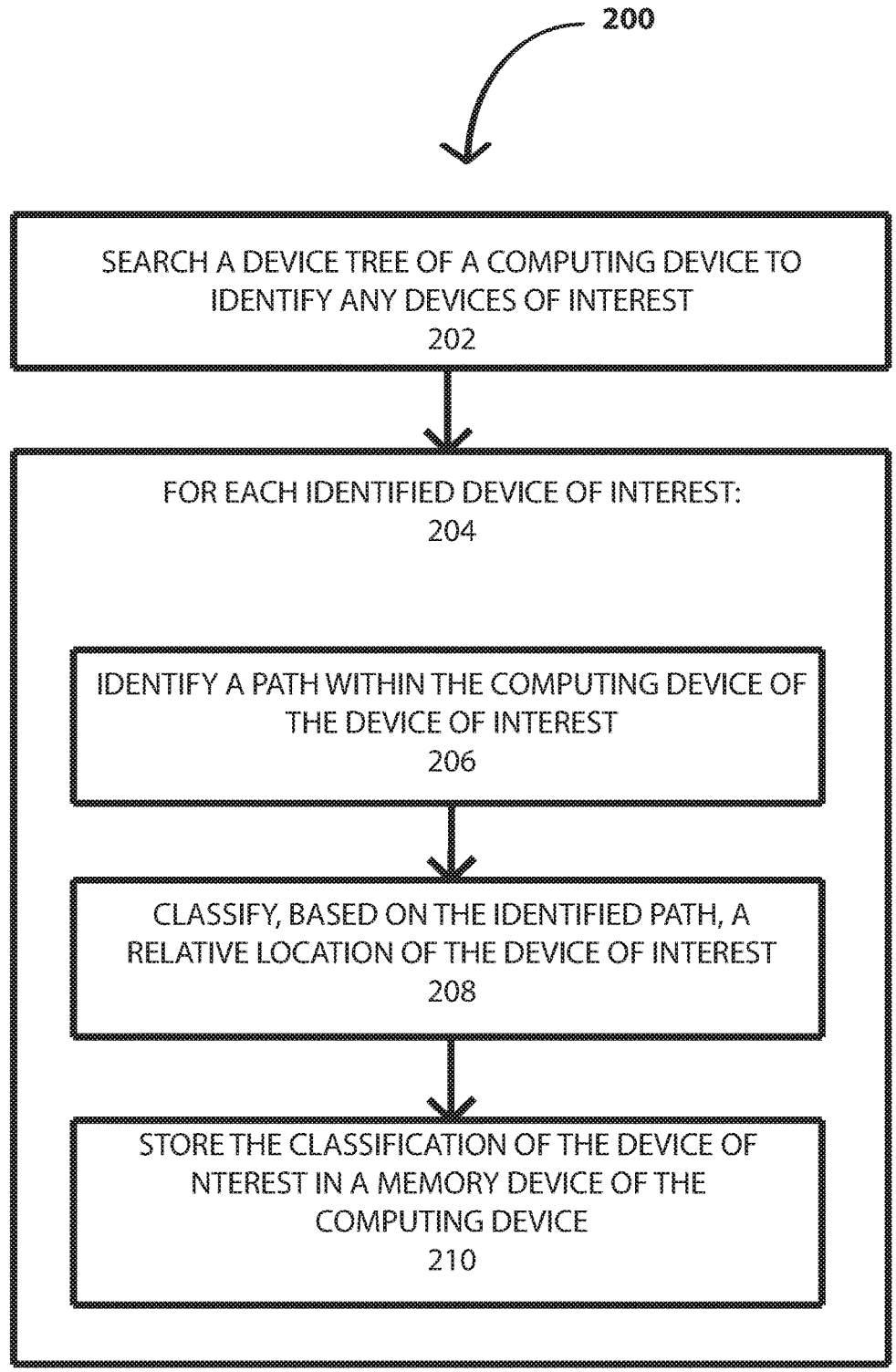
FIG. 2 is a logical block diagram of a method, according to an example embodiment.

FIG. 2 is a logical block diagram of a method 200, according to an example embodiment. The method 200 is an example of a method that may be performed on the computer 102 to classify how devices deployed on the computer 102 are coupled thereto, such as to generate the data structure 120 of FIG. 1.

The method 200 includes searching 202 a device tree of a computing device to identify any devices of interest. The devices of interest may be of a particular type having certain properties, such as a product identifier (PID), a vendor identifier (VID), or other device information that may be obtained from an operating system that executes on a computer to which the device or devices may be connected.

The method 200 may then, for each identified device of interest 204, identify 206 a path within the computing device of the device of interest and classify 208, based on the identified path, a relative location of the device of interest. The method may then store 210 the classification of the device of interest in a memory device of the computing device. Upon classifying a device of interest, the method 200 then repeats with the next device by performing the identifying 206, classifying 208, and storing 210 until all identified devices of interest have been classified.

In some embodiments, a device of interest that is searched 202 for in the device tree is defined by at least one property identifiable through at least one or a combination of computing device operating system calls and queries to a device. Further, in some embodiments, the relative location identifies whether a device of interest is internal to the computing device or otherwise connected to a root hub or connected to the computing device via an ancillary connection, such as the hub 108 of FIG. 1 via a USB connection.

In some embodiments of the method 200, the stored 210 classification of a device of interest is stored 210 as configuration data for at least one process to inform the process in view of at least one other configuration setting. In other embodiments, the stored 210 classification is stored 210 in a manner that informs a program or process when applying configuration settings.

In a particular embodiment, there may be two devices of interest that are both MSR devices. Of the two MSR devices, a first MSR device may be classified as connected internally to the computing device and a second MSR device may be classified as connected externally to the computing device. For example, an MSR device connected to a root hub may be classified as internal and an MSR device connected to a hub may be classified as external. The internal and external connections may also refer to an actual physical connection internal or external to a housing of a computer, but this may not be true in all embodiments and instead simply be with regard to whether an MSR device, or other device is connected directly or indirectly to the root hub.

Continuing with the particular embodiment, this embodiment further includes an MSR data receiving process that identifies whether received MSR device data is received from the first or second MSR device and a type of MSR device data received. The method of this embodiment may then determine whether the received MSR data is of a type of MSR data that is configured as allowed to be received via the MSR device from which the MSR data was received. For example the configuration may allow bankcard data or other data to be received from only one or from both of the first and second MSR devices.

In some embodiments of the method 200 identifying 206 the path within the computing device of the device of interest includes retrieving information identifying a parent device to which the device of interest is coupled from an operating system (OS) of the computing device via an Application Programming Interface (API) call. For example, such an API call in a MICROSOFT® WINDOWS® operating system available from MICROSOFT® Corporation of Redmond, Wash. is the CM_Get_Parent function. When the parent device is a USB hub or a USB composite device identified in data received in response to the API call, some embodiments include storing a handle of the parent device in memory as the direct parent device of the device of interest. Such embodiments may then retrieve information of a next parent device and repeat until a type of the parent device is a root hub. However, when the parent device is the root hub, this embodiment may then store a handle of the root hub in memory as a parent device of the last device for which parent device information was retrieved.

Figure 3:
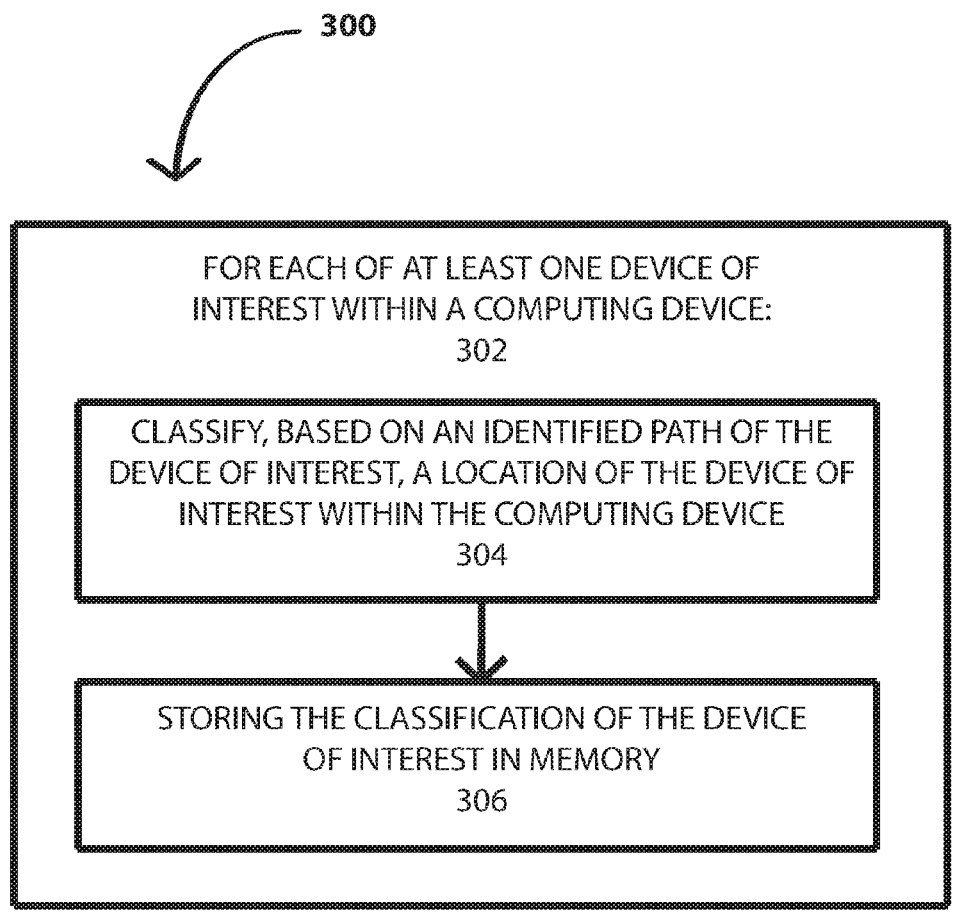
FIG. 3 is a logical block diagram of a method, according to an example embodiment.

FIG. 3 is a logical block diagram of a method 300, according to an example embodiment. The method 300 is another example of a method that may be performed on the computer 102 to classify how devices deployed on the computer 102 are coupled thereto, such as to generate the data structure 120 of FIG. 1.

The method 300 includes, for each of at least one device of interest within a computing device 302, classifying 304, based on an identified path of the device of interest, a location of the device of interest within the computing device. The method 300 further includes storing 306 the classification of the device of interest in memory.

In some embodiments of the method 300, each of the the at least one devices of interest are devices of the same device type. Further, an identified path of the device of interest performed for each of the at least one devices of interest may be identified by identifying a path from a root device hub to each of the at least one devices of interest. This identifying may include retrieving a device information set from each device of interest coupled to the computing device of a particular device-type of the same device-type. The device information set may include a handle to communicate with each respective device. Further, for each device of interest, such embodiment may then retrieve a parent device handle from an operating system OS. For each parent device handle retrieved in such embodiments that is not a device handle of a root hub to which the device of interest is connected, the method includes retrieving a further parent device handle and repeating until the device handle of the root hub is obtained. The method 300 in such embodiments, further includes storing each retrieved device handle in an associative manner in memory forming a logical device tree from the root hub to each of the at least one devices of interest.

Figure 4:
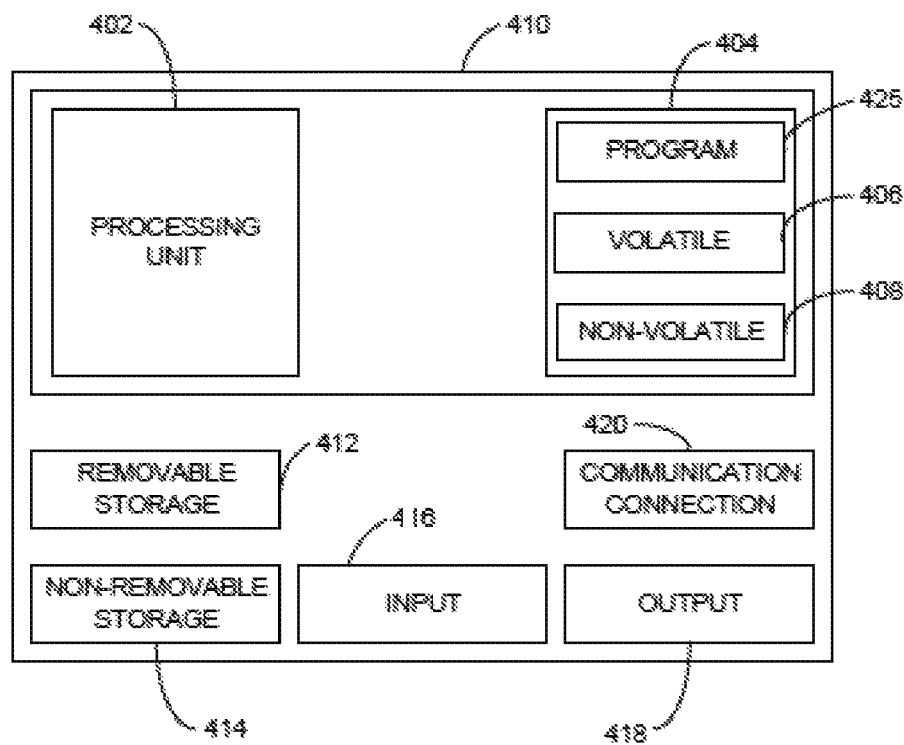
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. The computing device of FIG. 4 may take different forms in individual and different embodiments. For example, a computer of an ATM, a computer of a POS terminal, and the like, such as computer 102 of the POS terminal 100 of FIG. 1. One example computing device in the form of a computer 410, may include a processing unit 402, memory 404, removable storage 412, and non-removable storage 414. Further, although the various data storage elements are illustrated as part of the computer 410, the storage may also or alternatively include cloud-based storage accessible via a network, such as the Internet.

Memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, personal identification number (PIN) pad, encrypting PIN pad, a bankcard chip reader, a magnetic stripe (MSR) reader, camera, one or more device-specific buttons, one or more sensors integrated within or coupled via wired or wireless data connections to the computer 410, composite devices including two or more of such devices, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
searching a device tree of a computing device to identify any devices of interest; and
for each identified device of interest:
identifying a path within the computing device of the device of interest;
classifying, based on the identified path, a relative location of the device of interest; and
storing the classification of the device of interest in a memory device of the computing device, the stored classification of the device of interest stored as configuration data for at least one process to inform the process in view of at least one other configuration setting that enables or disables at least one function that may be performed with or input that may be received via the device of interest.

2. The method of claim 1, wherein a device of interest that is searched for in the device tree is defined by at least one property identifiable through at least one or a combination of computing device operating system calls and queries to a device.

3. The method of claim 1, wherein a relative location identifies whether a device of interest is internal to the computing device or connected to the computing device via an ancillary connection.

4. The method of claim 3, wherein the ancillary connection is a Universal Serial Bus (USB) connection.

5. The method of claim 1, wherein:
there are two devices of interest, each device of interest being a magnetic stripe reader (MSR) device;
a first MSR device is classified as connected internally to the computing device and a second MSR device is classified as connected externally to the computing device;
an MSR data receiving process:
identifies whether received MSR device data is received from the first or second MSR device and a type of MSR device data received; and
determines whether the received MSR data is of a type of MSR data that is configured as allowed to be received via the MSR device from which the MSR data was received.

6. The method of claim 5, wherein configuration settings of the MSR data receiving process allow bankcard data to be received via only one of the first and second MSR devices.

7. The method of claim 1, wherein identifying the path within the computing device of the device of interest includes:
retrieving information identifying a parent device to which the device of interest is coupled from an operating system (OS) of the computing device via an Application Programming Interface (API) call;
when the parent device is a Universal Serial Bus (USB) hub or a USB composite device, storing a handle of the parent device in memory as the direct parent device of the device of interest and retrieving information of a next parent device and repeat until a type of the parent device is a root hub; and
when the parent device is the root hub, store a handle of the root hub in memory as a parent device of the last device for which parent device information was retrieved.

8. The method of claim 7, wherein the device information is stored in memory in a referential manner forming a logical tree of how the devices are arranged in a tree-like structure.

9. A method comprising:
for each of at least one device of interest within a computing device:
classifying, based on an identified path of the device of interest, a location of the device of interest within the computing device; and
storing the classification of the device of interest in memory, the stored classification of the device of interest stored as configuration data for at least one process to inform the process in view of at least one other configuration setting that enables or disables at least one function that may be performed with or input that may be received via the device of interest.

10. The method of claim 9, wherein each of the at least one devices of interest are devices of the same device type.

11. The method of claim 10, wherein an identified path of the device of interest performed for each of the at least one devices of interest is identified by identifying a path from a root device hub to each of the at least one devices of interest by performing data processing activities comprising:
retrieving a device information set from each device of interest coupled to the computing device of a particular device-type of the same device-type, the device information set including a handle to communicate with each respective device;
for each device of interest, retrieving a parent device handle from an operating system (OS);
for each parent device handle retrieved that is not a device handle of a root hub to which the device of interest is connected, retrieving a further parent device handle and repeating until the device handle of the root hub is obtained;
storing each retrieved device handle in an associative manner in memory forming a logical device tree from the root hub to each of the at least one devices of interest.

12. The method of claim 11, wherein classifying, based on an identified path of the device of interest, a location of the device of interest within the computing device includes:
classifying a device of interest coupled directly to the root hub or a device of interest that is part of a composite device coupled directly to the root hub as having a location internal to the computing device; and
classifying a device of interest not coupled directly to a root hub or as part of a composite device not coupled directly to the root hub as having a location external to the computing device.

13. The method of claim 11, wherein each of at least one devices of interest are Universal Serial Bus (USB) devices.

14. The method of claim 13, wherein each device of interest is a magnetic stripe reader (MSR) device.

15. A computing device comprising:
a root Universal Serial Bus (USB) hub:
an external USB hub coupled to the root USB hub;
a first USB device of a particular USB device-type coupled to the root USB hub;
a second USB device of the particular USB device-type coupled to the external USB hub;
a processor;
a memory;
a USB device location classification process stored in the memory and executable by the processor to perform data processing activities to classify a deployed location of USB devices of the particular USB device-type coupled to the computing device, the data processing activities comprising:
for each USB device of the particular device-type coupled to the computing device:
classifying, based on an identified path of the USB device of the particular USB device-type, a location of the USB device; and
storing the classification of the USB device of interest in the memory, the stored classification of the device of interest stored as configuration data for at least one process to inform the process in view of at least one other configuration setting that enables or disables at least one function that may be performed with or input that may be received via the device of interest.

16. The computing device of claim 15, wherein an identified path of the USB device performed for each of the at least one USB devices of the particular USB device-type is identified by identifying a path from the root USB hub to each of the at least one devices of interest by performing further data processing activities comprising:
retrieving a device information set from each USB device of the particular USB device-type, the device information set including a handle to communicate with each respective USB device;
for each USB device of the particular USB device-type, retrieving a parent device handle from an operating system (OS) that executes on the processor of the computing device;

for each parent device handle retrieved that is not a device handle of the root USB hub to which the device of interest is connected, retrieving a further parent device handle and repeating until the device handle of the root USB hub is obtained;

storing each retrieved device handle in an associative manner in the memory forming a logical device tree from the root USB hub to each of the at least one USB devices of the particular USB device-type, the stored data including data representative of:
  a first path from the first USB device directly to the root USB hub; and
  a second path from the second USB device to the external USB hub and from the external USB hub to the root USB hub.

17. The computing device of claim 16, wherein classifying, based on the identified path of the USB device of the particular USB device-type, the location of the USB device includes:

classifying a USB device of the particular USB device-type coupled directly to the root USB hub or a USB device of the particular USB device-type that is part of a composite device coupled directly to the root USB hub as having a location internal to the computing device; and classifying a USB device of the particular USB device-type not coupled directly to a root hub or a USB device of the particular USB device-type that is part of a composite device not coupled directly to the root hub as having a location external to the computing device.

18. The computing device of claim 15, wherein the first and second USB devices are both magnetic stripe reader (MSR) devices.

19. The method of claim 18, wherein at least one of the first and second USB devices are composite devices including the MSR and another portion that performs another function.

* * * * *